(12) United States Patent
Barton et al.

(10) Patent No.: US 11,494,662 B2
(45) Date of Patent: Nov. 8, 2022

(54) CENTRALIZED FRAMEWORK FOR SMALL BATCH MANUFACTURING

(71) Applicant: The Regents of The University of Michigan, Ann Arbor, MI (US)

(72) Inventors: Kira Barton, Ann Arbor, MI (US); Yikai Lin, Ann Arbor, MI (US); Zhuoqing M. Mao, Ann Arbor, MI (US); Dawn M. Tilbury, Ann Arbor, MI (US); Efe Balta, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 832 days.

(21) Appl. No.: 15/999,327

(22) Filed: Aug. 17, 2018

(65) Prior Publication Data
US 2020/0012947 A1      Jan. 9, 2020

Related U.S. Application Data

(60) Provisional application No. 62/547,270, filed on Aug. 18, 2017.

(51) Int. Cl.
*G06Q 30/00* (2012.01)
*G06N 3/12* (2006.01)
*G06Q 30/06* (2012.01)

(52) U.S. Cl.
CPC ......... *G06N 3/126* (2013.01); *G06Q 30/0611* (2013.01)

(58) Field of Classification Search
CPC .... G06N 3/126; G06Q 30/0611; G06Q 50/04; G06Q 10/04; Y02P 90/30
See application file for complete search history.

(56) References Cited

U.S. PATENT DOCUMENTS 6,233,493 B1    5/2001  Cherneff et al.
7,099,871 B2    8/2006  Faybishenko et al.
(Continued)

FOREIGN PATENT DOCUMENTS

CN       109272418 A   *  1/2019

OTHER PUBLICATIONS

Keila Martinez, "Prioritizing Customer Orders in a High-End Server Manufacturing Environment Using Artificial Neural Networks" Department of Systems Science and Industrial Engineering State University of New York at Binghamton, 2012 Industrial Systems Engineering Research Conference. (Year: 2012).*

(Continued)

*Primary Examiner* — Raquel Alvarez
(74) *Attorney, Agent, or Firm* — Harness, Dickey & Pierce, P.L.C.

(57) ABSTRACT

Today, product developers with customized small batch production needs come across the problem of finding capable and flexible manufacturers, while manufacturers face underutilization due to inconsistent demand. In this disclosure, a digital manufacturing framework is presented to address the challenge of matching the underutilized manufacturers with the new product developers. This disclosure presents a Production as a Service (PaaS) framework to connect users (consumers or product developers) who have customized small batch manufacturing needs, with manufacturers that have existing underutilized resources. PaaS is a cloud-based, centralized framework based on a service oriented architecture (SOA) that abstracts the manufacturing steps of a product as individual (production) service requests. PaaS creates a market place for small-to-mid sized manufacturing industry by coordinating multiple manufacturers to provide the requested services. Using PaaS, the user is able to reach many capable manufacturers (Continued)

at once, and receive quotations for the production request. On the other end, PaaS reduces the effort required to find new customers and enables manufacturers to easily submit quotations to increase the utilization of their resources.

16 Claims, 11 Drawing Sheets

(56) References Cited

U.S. PATENT DOCUMENTS

| | | | |
|---|---|---|---|
| 7,127,310 B1 | 10/2006 | Barto et al. | |
| 2003/0033040 A1* | 2/2003 | Billings | G06Q 10/04 |
| | | | 700/97 |
| 2005/0021599 A1 | 1/2005 | Peters | |
| 2006/0287932 A1 | 12/2006 | Wulteputte et al. | |
| 2008/0021754 A1* | 1/2008 | Horn | G06Q 10/04 |
| | | | 705/7.31 |
| 2008/0269942 A1 | 10/2008 | Free | |
| 2014/0337429 A1 | 11/2014 | Asenjo et al. | |
| 2014/0379492 A1* | 12/2014 | Takata | G06Q 30/0275 |
| | | | 705/14.71 |
| 2015/0019365 A1* | 1/2015 | Vieira | G06Q 30/0611 |
| | | | 705/26.3 |

OTHER PUBLICATIONS

M. Porter et al "Production as a Service: Optimizing Utilization in Manufacturing Systems", ASME 2016 Dynamic Systems and Control Conference (Oct. 2016).

* cited by examiner

FIG. 6

Cost ($):

Time (days):

Batch size:
100

Minimum Volume:

Name: Cut-Extrude1
Material: 6063-T6
User Picked Method: Machining (Drilling)
Your Choice
Dimensions:
  Width: 2
  Height: 1
  Length: 3
Tolerances:
  dimType: diameter
  fitValues: 18, H8
  isAssgn: true
  name: D1@Sketch3@Chassis_v2.Part
  nominalValue: 0.29522
  tolerMaxVar: -0.000393
  tolerMinVar: -0.001102
  tolerType: Fit w/toler Standard Deviation:

Statistical Mean:

CENTRALIZED FRAMEWORK FOR SMALL BATCH MANUFACTURING

CROSS-REFERENCE TO RELATED APPLICATIONS

This application claims the benefit of U.S. Provisional Application No. 62/547,270, filed on Aug. 18, 2017. The entire disclosure of the above application is incorporated herein by reference.

GOVERNMENT CLAUSE

This invention was made with government support under CNS-1546036 awarded by the National Science Foundation. The Government has certain rights in this invention.

FIELD

The present disclosure relates to centralized framework for small batch manufacturing.

BACKGROUND

With the increasing demand for product customization, manufacturing systems are becoming more flexible, customizable, and intelligent. Digital manufacturing solutions are utilized in the industry to enable more robust and flexible manufacturing systems. However, conventional manufacturing systems with static supply chains (SC) and production plans for mass production lack flexibility to coordinate distributed manufacturers and their resources in an efficient manner. As a result, product developers with small batch custom manufacturing needs often suffer from the task of finding manufacturers with available resources and sufficient system flexibility to integrate new products into the production line. On the other hand, manufacturers with idle resources face underutilization due to inconsistent demand. Developing a method for automatically matching product developers with manufacturers will enable faster customized production cycles, and more efficient use of the available resources in the manufacturing industry. Current efforts to address this challenge include companies that manually match users with manufacturers, resulting in a labor intensive approach that does not scale well, and some automated web-based solutions that are not very flexible due to the lack of abstraction and limited manufacturer selections. Manufacturing solutions also cannot easily be divided amongst manufacturers, for example with multiple processes per manufacturer.

The use of digital manufacturing solutions to enable automated matching of resources to demands is of recent research interests in both academia and industry. Service-oriented architectures (SOA) have been proposed in software engineering to address the need for collaboration and abstraction to accomplish customized tasks. The use of SOA in manufacturing automation is well documented in the literature. However, the scalability of the approach is not discussed, nor its extension to multiple manufacturing systems simultaneously. These architectures also lack a mathematical framework to map the production requirements into a mathematical model for optimization of performance metrics.

Current literature in SOA for manufacturing lacks a concrete data structure to represent manufacturing services in terms of product requirements, as well as protection of intellectual property (IP). Therefore, there is a need for a unifying and scalable approach with the appropriate ontology to (1) abstract the product data from the customer end, (2) translate the customer demand into manufacturer capabilities, and (3) optimize the requested manufacturing services for each product for both the manufacturer and the customer.

This section provides background information related to the present disclosure which is not necessarily prior art.

SUMMARY

This section provides a general summary of the disclosure, and is not a comprehensive disclosure of its full scope or all of its features.

A computer-implemented method is presented for selecting a manufacturing solution for manufacturing a product for a customer, where the manufacturing solution is comprised of two or more manufacturing processes. The method includes: receiving a set of quotes for manufacturing the product, where each quote identifies a manufacturer providing the given quote, provides a listing of manufacturing processes in the given quote, a cost of the given quote, and a processing time for the given quote; receiving a set of precedence for the manufacturing processes which comprise the manufacturing solution; generating a set of candidate solutions from the set of quotes, where each candidate solution accounts for the set of precedence and is comprised of one or more quotes, such that the one or more quotes in a given candidate solution includes each of the two or more manufacturing processes for the product; iteratively applying a genetic algorithm to the set of candidate solutions and thereby yielding a set of optimized solutions; and presenting the set of optimized solutions for the product to the customer.

Generating a set of candidate solutions can further comprise determining availability of each of the two or more manufacturing process for inclusion in a candidate solution, where availability of a given manufacturing process complies with the set of precedence; randomly selecting a particular manufacturing process from the available manufacturing processes; selecting a quote from the set of quotes, where the selected quote includes the randomly selected manufacturing process; appending the selected quote to a particular candidate solution; repeating steps of this claim until the particular candidate solution includes each of the two or more manufacturing processes; and adding the particular candidate solution to the set of candidate solutions. In one embodiment, the availability of the two or more manufacturing processes is maintained using a tracking vector, where value of an element in the tracking vector indicates availability of a given manufacturing process and number of elements in the tracking vector corresponds to number of manufacturing processes comprising the manufacturing solution. In this embodiment, values of elements in the tracking vector can be set in accordance with the set of precedence prior to determining availability of the two or more manufacturing processes, thereby ensuring selection of the manufacturing processes complies with the set of precedence.

The method can further include evaluating each candidate solution in the set of candidate solutions according to a fitness function that minimizes cost of the manufacturing solution and processing time for the manufacturing solution while maximizing quality of the product; and selecting parents from the set of candidate solutions for a next generation of the genetic algorithm, where the selection of parents uses output of the fitness function evaluated for each candidate solution. In one embodiment, the methods includes receiving values for a first weight, a second weight and a third weight from the customer, where the first weight pertains to cost of the manufacturing solution, the second weight pertains to the processing time for the manufacturing solution and the third weight pertains to the quality of the product; and evaluating each candidate solution in the set of candidate solutions according to the fitness function and using the values for the first weight, the second weight and the third weight, where the fitness function is a weight function having the first weight, the second weight and the third weight.

In one embodiment, evaluating candidate solutions includes identifying a bottleneck manufacturing process in the particular candidate solution; selecting another quote from the set of quotes, where the selected quote includes the bottleneck manufacturing process; and appending the another quote to the particular candidate solution.

Applying the genetic algorithm to the set of candidate solutions can include applying a crossover operation to the selected parents and applying a mutation operation.

The method can also include receiving, by a production quote interface, a request for quote for manufacturing the product from the customer, where the request for quote includes design data for the product and the design data is extracted from a computer-aided design tool; encoding, by the production quote interface, the design data for the product into an encoded product feature format; and transmitting, by the production quote interface, the request for quote to one or more manufacturers, where the design data in the request for quote is in the encoded product feature format.

In one embodiment, the encoded product feature format includes a listing of components which comprise the product, for each component in the listing of components, the encoded product feature further includes a type of material for the given component, a nominal volume for the material, a manufacturing process, nominal dimensions for the manufacturing process, tolerance specification for the manufacturing process, and precedence constraints for the manufacturing process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
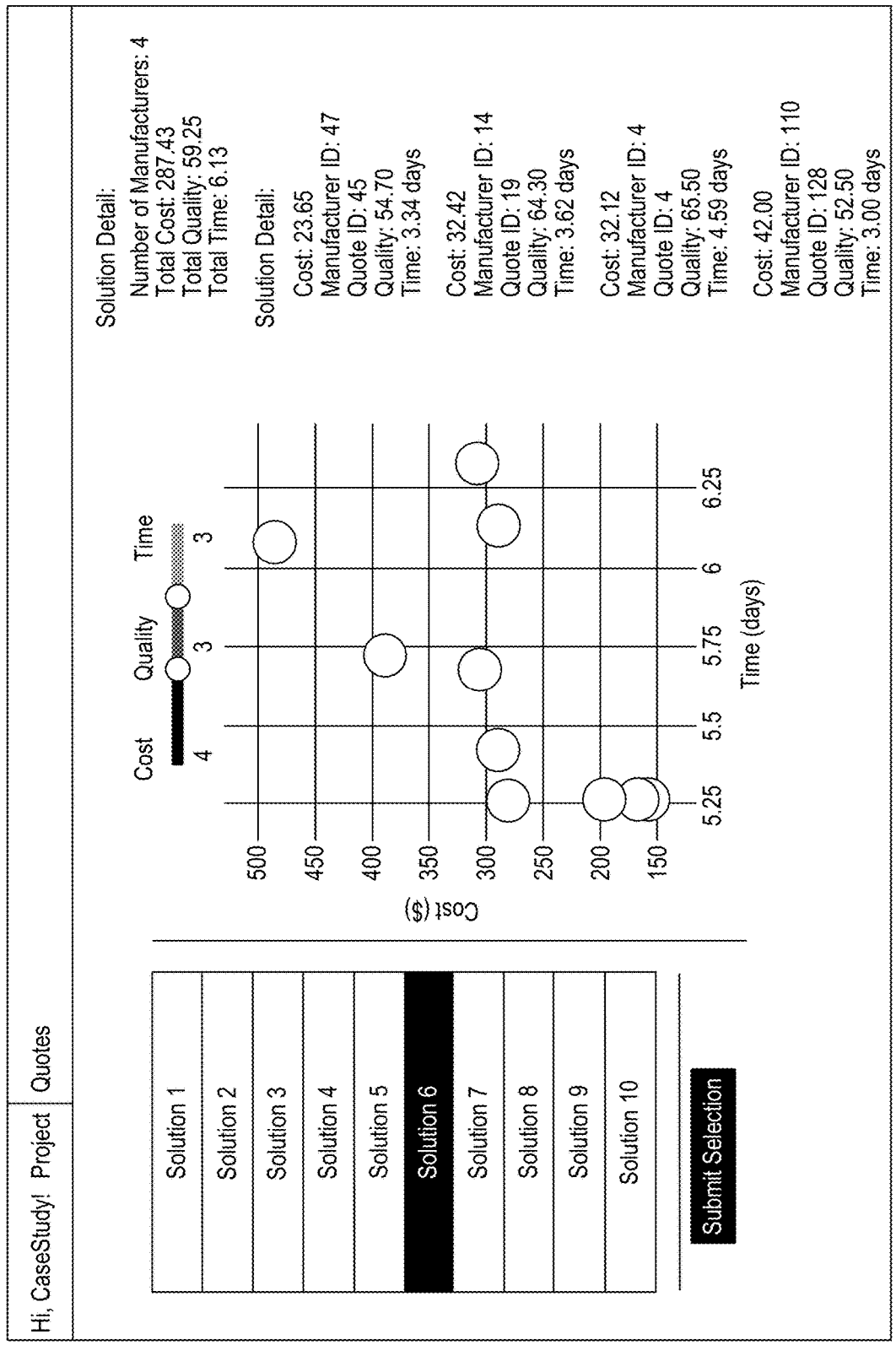

FIG. 5 shows the visualization of the optimization results from the back-end service engine. User can change the preference on the CTQ using the bar on the top. For each combination of CTQ, a list of solutions (10 best solutions per the chosen CTQ) is presented on the left column. Figure on the center is a plot of total time versus total cost of the solutions on the left. Size of the circles on the plot signifies the quality index of the solution. Details of the selected solution (pink) are given on the right column.

FIG. 6 illustrates an example user interface, where RFQ submitted by the user is forwarded to the manufacturer's profile. Manufacturer specifies the processes, manufacturing methods, CTQ and process capabilities through the manufacturer interface.

Figure 7:
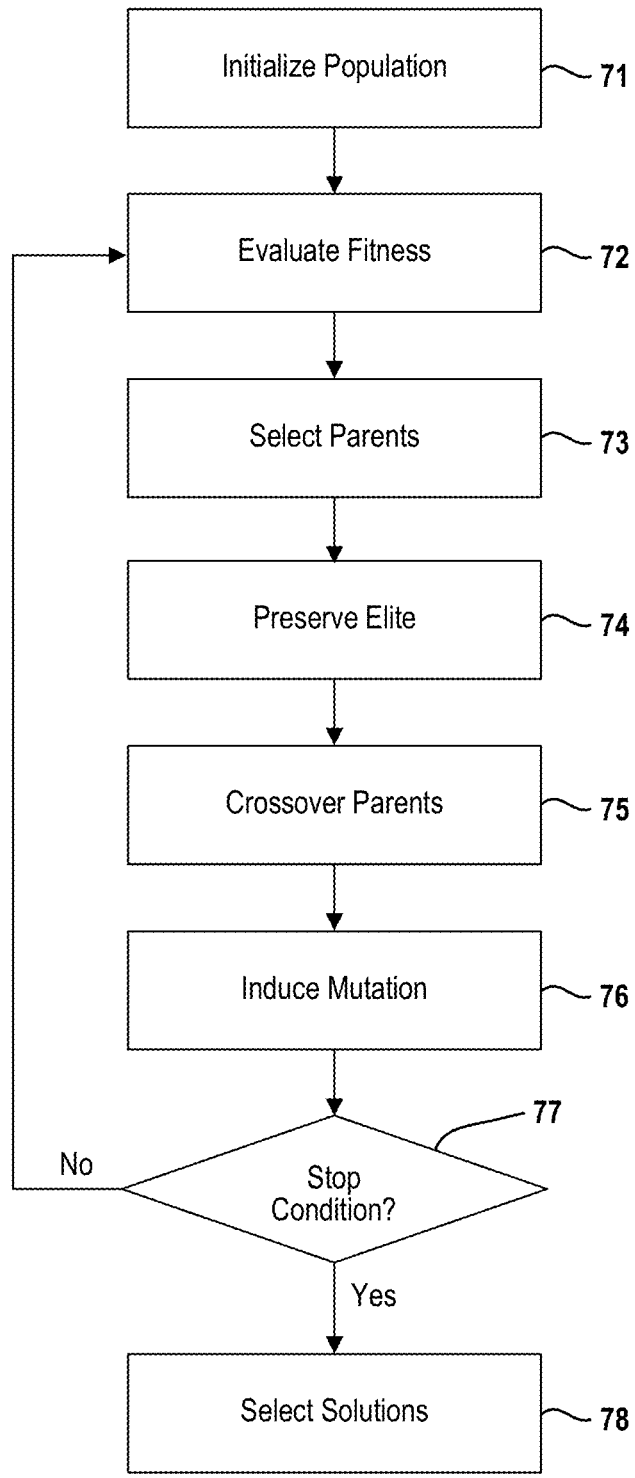

FIG. 7 is a flowchart depicting an example method for selecting a manufacturing solution for a product using a genetic algorithm.

Figure 8:
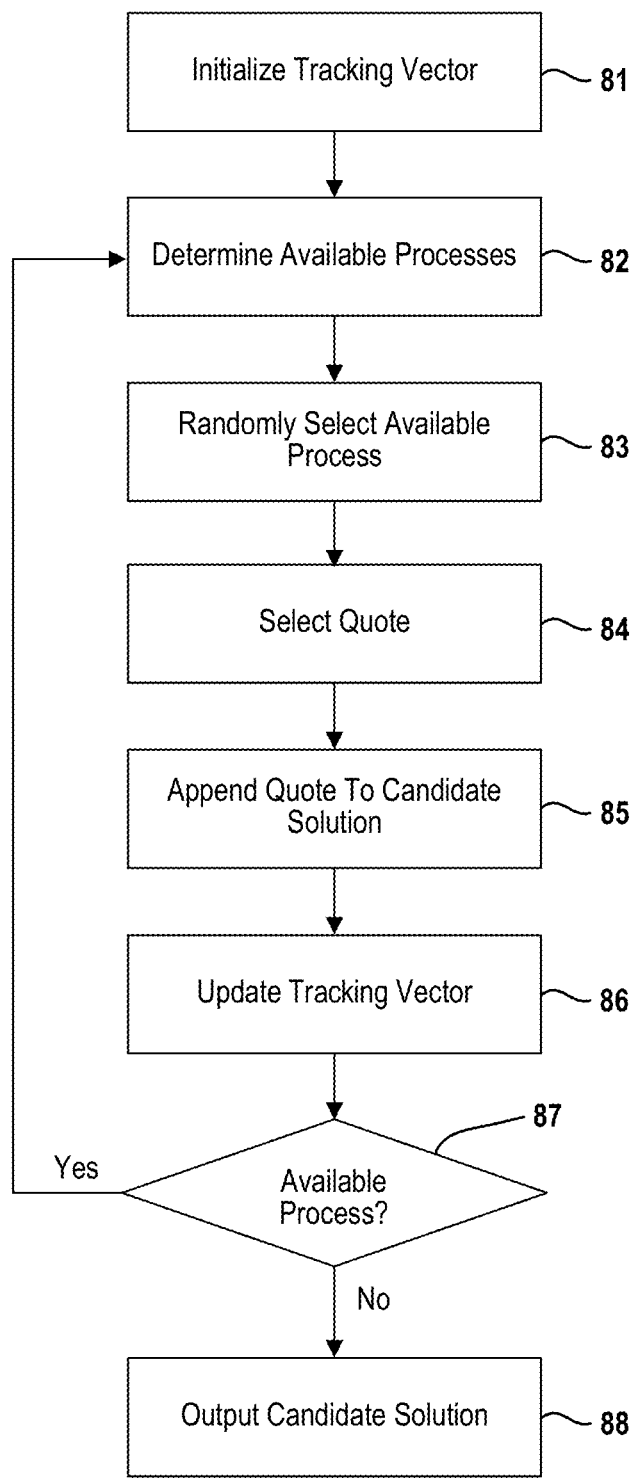

FIG. 8 is a flowchart depicting an example method for initializing a set of solution candidates.

Figure 9:
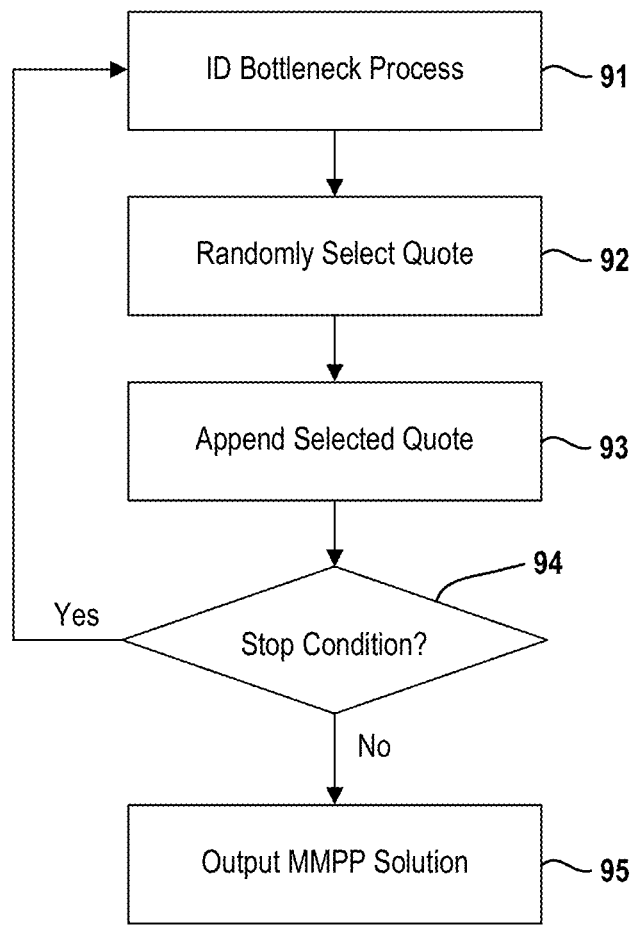

FIG. 9 is a flowchart depicting an example method for evaluating candidate solutions for batch splitting problem.

Figure 10:
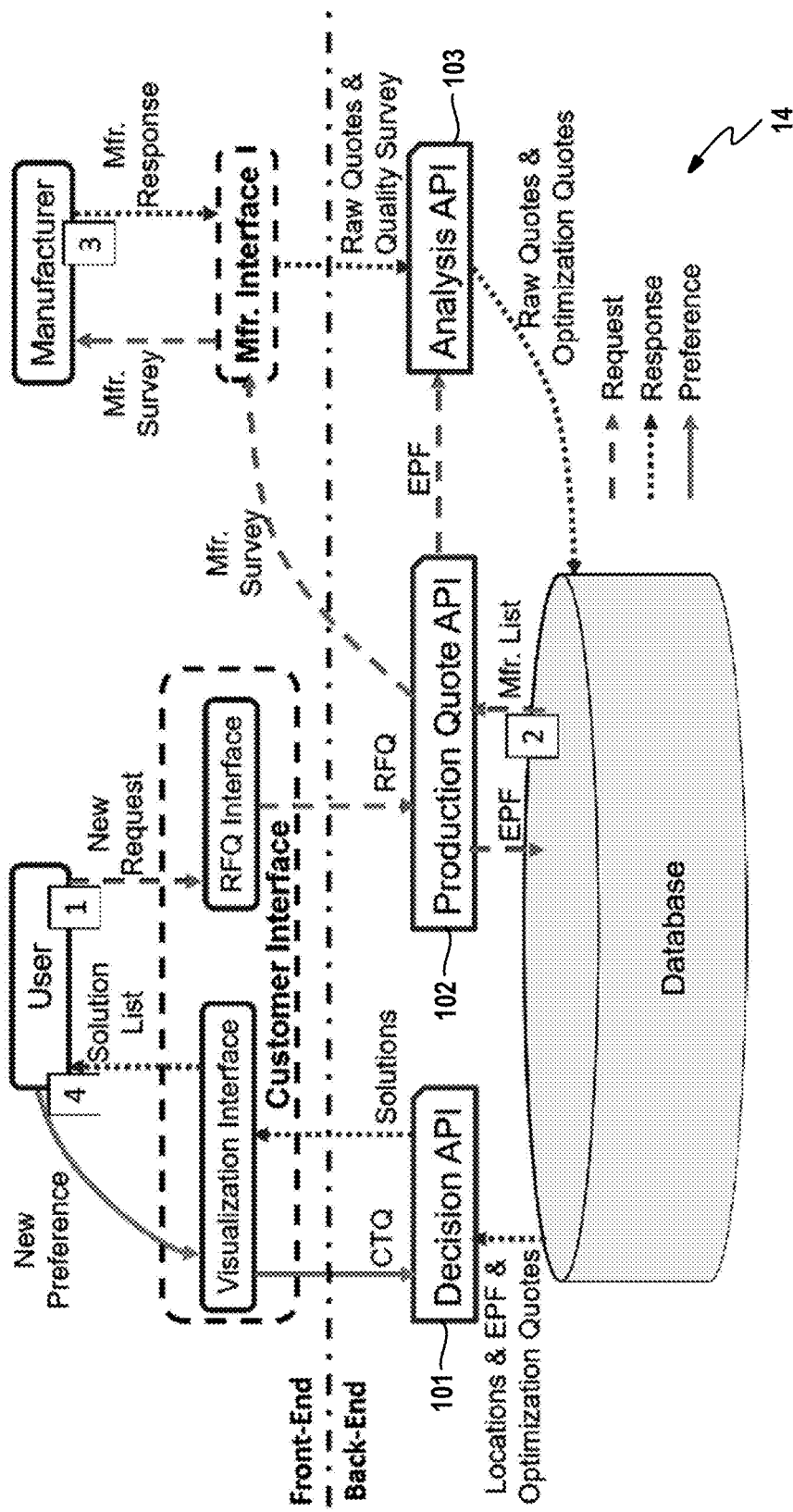

FIG. 10 is a diagram further illustrating the PaaS framework, where (1) User submits a new production request to the framework through the Customer Interface (RFQ Interface); (2) Manufacturers with adequate capabilities are notified with the manufacturer survey; (3) Manufacturer responds to the manufacturer survey through the Mfr Interface; and (4) User changes the preference on the weight of cost, time, and quality of the evaluated solution, until deciding on using a specific solution.

Figure 11:
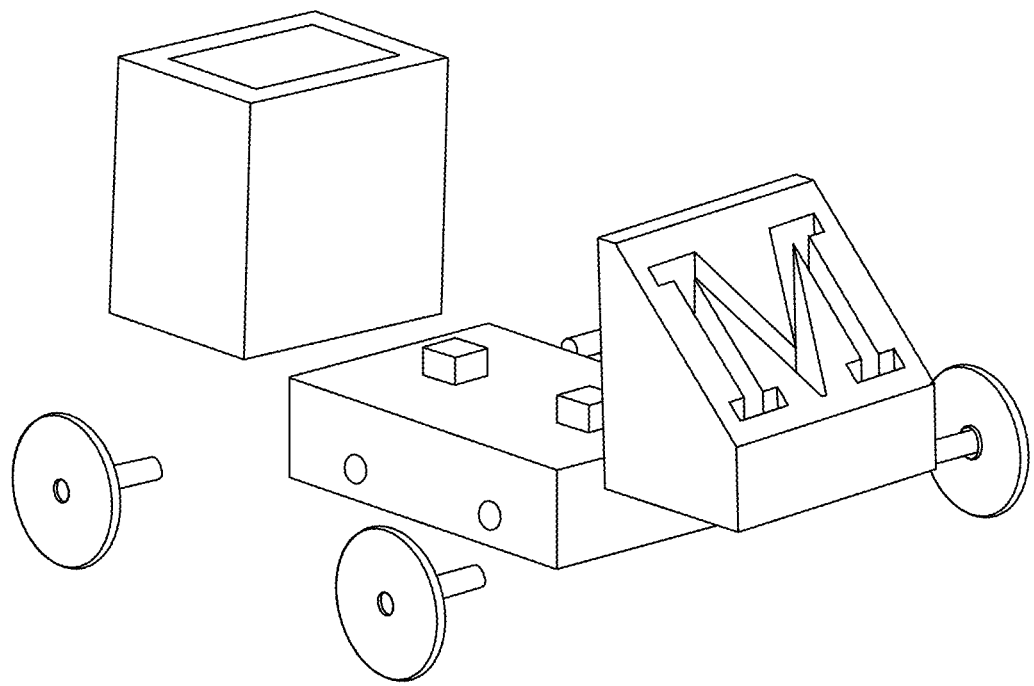

FIG. 11 is a diagram of an exploded view of the model truck design used in the case study.

Figure 12:
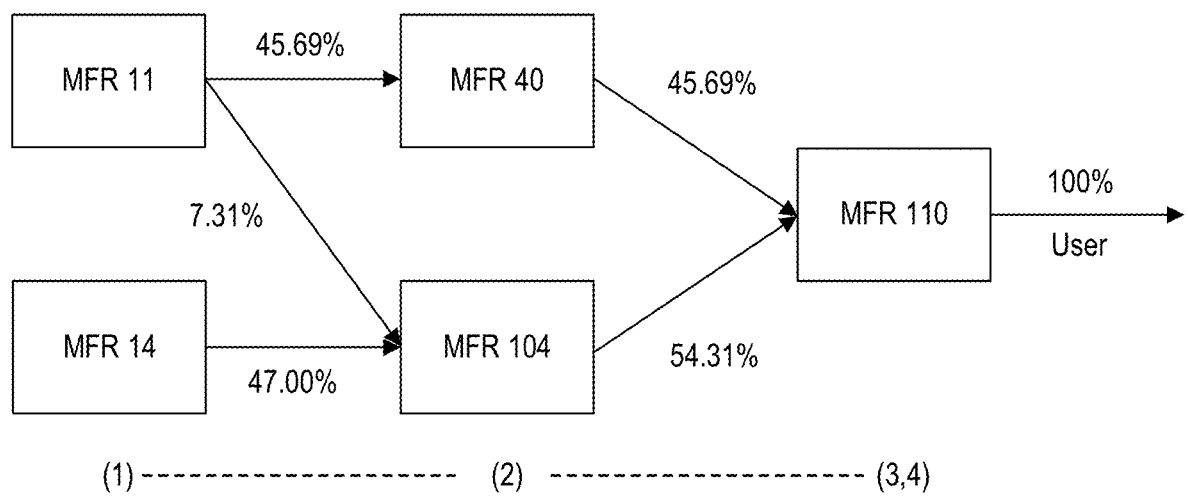

FIG. 12 is a diagram showing the hybrid (parallel/serial) manufacturing system layout for the MMPP solution. Numbers on the bottom are the manufacturing processes conducted by each manufacturer. Percentages on the arrows denote $b_{ij}$ for each manufacturer, i.e, $b_{11,40}$=45.69%, $b_{11,104}$=7.31%.

Figure 13:
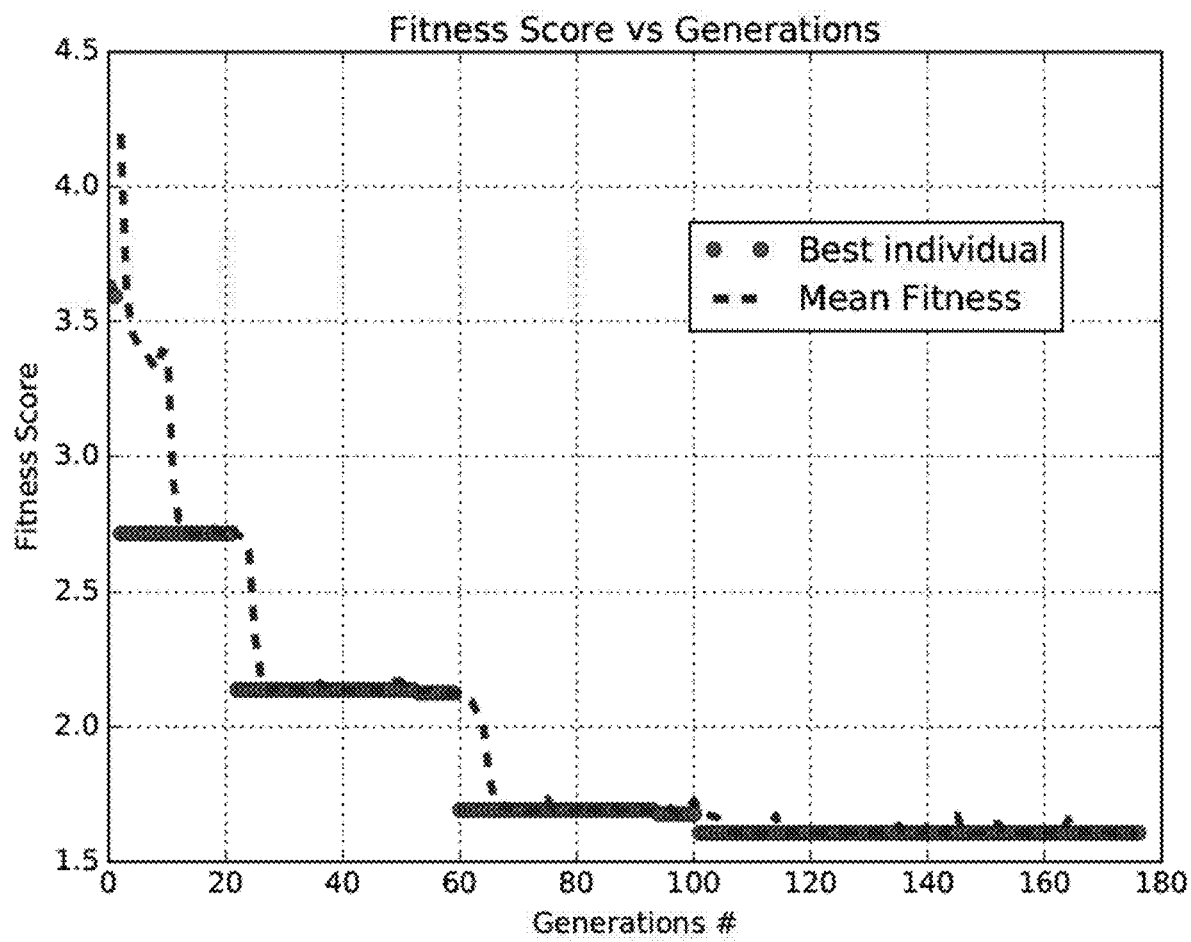

FIG. 13 is a graph showing individual scores versus GA generations. Solid dots are the scores of the best individuals, and dashed lines are the mean fitness scores of the generations. Number of quotes in the simulation is $|\mathbb{D}|$=129. Constants used in the optimization $\zeta_k$=0.75($/km), $\zeta_t$=0.0029(day/km).

Corresponding reference numerals indicate corresponding parts throughout the several views of the drawings.

DETAILED DESCRIPTION

Example embodiments will now be described more fully with reference to the accompanying drawings.

Production as a Service (PaaS) is a cloud-based framework for connecting geo-distributed manufacturers with users in need of specific custom manufacturing. The user, an end consumer or a product developer with custom manufacturing needs, creates production requests for a product through a front-end interface. A product is decomposed into its components to identify the required manufacturing processes, which are abstracted as service requests. A service request is instantiated using a request for quotation (RFQ) input from the user, and the abstracted design feature data parsed using feature extraction module. After the request is created, it is forwarded to a list of manufacturers with suitable manufacturing capabilities. The manufacturers then submit quotes using a predefined quote format and the set of quotes that span a feasible production scheme (e.g. the solution set) are presented to the user. The solutions are formed using a specialized optimization algorithm that takes precedence constraints and customer defined weights on cost, manufacturing quality, and time into consideration. Once the user selects a specific solution, the manufacturers specified within the solution are linked with the user to refine details and initiate the production process. This efficient strategy enables the user to reach multiple suppliers at once, while tailoring the service requests for individual manufacture capabilities. By supplying quotes, manufacturers reach a community of potential customers, with the potential to improve the overall utilization of idle resources.

Definitions that are used throughout this disclosure are as follows.

Product: The final produced good as a result of the requested services, that is complete and will be sent to the user. A product may be comprised of multiple components.

Component: A discrete manufactured good that is produced by a series of manufacturing processes applied to a single stock of raw material, or a single printable material in the case of additive manufacturing (AM). A component $c^i \in C$ belongs in the set of all components C in one order.

Process: A single manufacturing step applied to a component or product. Assembly operations are considered as processes. A process is abstracted as a service, thus users make a manufacturing service request and manufacturers supply services for the users.

Feature: The abstracted representation of the required data for the manufacturing of a subset of a component's geometry. Features are encoded in a predefined format and each feature is associated with a process.

Process Precedence Constraints: Multiple processes are generally required to manufacture a product or component. These processes must adhere to precedence constraints. A set of precedence constraints is denoted on an unordered set of z processes $A=\{\gamma_1, \ldots \gamma_z\}$, by $P_A=(\overline{I}_A, \overline{E}_A, \overline{M}_A)$. Sets $\overline{I}_A$, $\overline{E}_A$, and $\overline{M}_A$ are defined as follows: $\overline{I}_A$ is the set of initial constraints and contains the list of admissible initial processes; $\overline{E}_A$ is the set of soft constraints, where each constraint $\overline{e}_{\gamma_j,\gamma_k}^{\gamma_n}$ implies that process $\gamma_n$ has to occur after $\gamma_j$ and before $\gamma_k$; and $\overline{M}_A$ is the set of immediate (or hard) constraints, where each constraint $\overline{m}_{\gamma_j,\gamma_k}^{\gamma_n}$ implies that process $\gamma_n$ has to occur after $\gamma_j$, and before $\gamma_k$. Note that precedence constraints may include before and after constraints, but are not required to contain both.

TABLE 1

Important Variables Used In The Disclosure

| | |
|---|---|
| $c^i$ | Component i, $c^i \in C$ |
| C | Set of all components in the product |
| $M_j$ | Process specification |
| $\vec{y}$ | List of manufacturing methods |
| $\mathcal{T}_k$ | Tolerance specification |
| $(\mu_T, \sigma\mathcal{T})$ | Process mean and standard deviation |
| $\mathbb{D}$ | Set of all quotes for optimization |
| s | Abstraction of a production quote |
| $\mathbb{P}_C$ | Set of all requested processes for components in C |
| $\mathcal{P}_{\mathbb{P}_C}$ | Set of precedence constraints for the set $\mathbb{P}_C$ |
| $\vec{p}$ | List of processes in a quote ($\vec{p} \subseteq \mathbb{P}_C$) |
| S | Candidate solution |
| $X_{c^i}$ | Quotes in S associated with $c^i$ |
| L | Location matrix |
| $k_i, t_i, q_i$ | Cost, time, quality of quote $s_i$ |
| m | Minimum utilization rate |
| β | Batch size |
| $b_{ij}$ | Percent of β to be sent from i to j |
| $\alpha_0, \alpha_1, \alpha_2$ | Cost, time, quality weights |
| $\zeta_k, \zeta_t$ | Unit transportation cost and time |

Figures 1, 2:
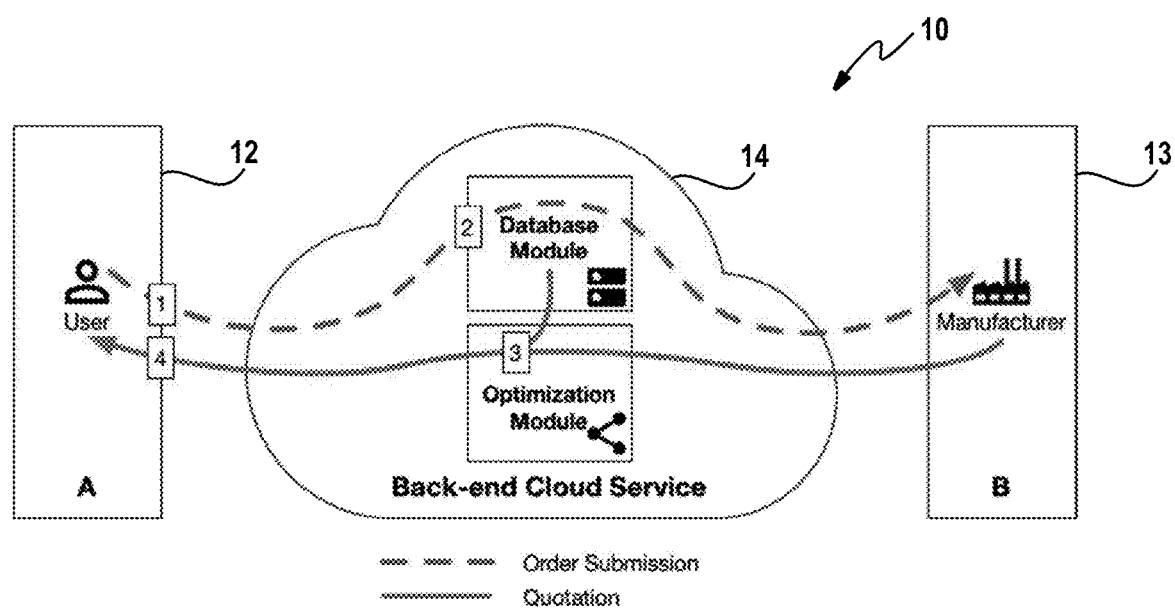
FIG. 1 is a diagram showing a high-level framework structure and the key steps in a manufacturing service request.
FIG. 2 illustrates an example user interface where user can specify required data to submit a new RFQ. CTQ weights scaled to integer values.

With reference to FIG. 1, the PaaS framework 10 consists of three main components: a customer interface 12, a manufacturer interface 13 and back-end service engine 14. Briefly, the customer interface 12 provides an interactive interface where users submit service requests, and receive optimized set of solutions. The manufacturer interface 13 provides an interactive interface where manufacturers review available service requests and submit production quotes. The back-end cloud service engine 14 contains a secure database, an optimization algorithm, and different application programming interfaces (APIs). These components are integrated using automated logic to efficiently and securely pass data from one end to another. The interfaces serve to obtain the necessary information from the users and manufacturers that is required to perform the API functions and optimization analysis in the back-end service engine. Coordination between the users and the manufacturers requires translating the user requests into manufacturer capabilities. The back-end services parse the user demands and manufacturer responses into a quantifiable data format in order to run the customized optimization algorithms. Direct communication between users and manufacturers is not required in the quoting process, which in turn increases efficiency and security within the framework.

An overview of the information flow in the framework is also shown in FIG. 1. First, a user logs on to the system and submits an RFQ. Second, the RFQ is abstracted and forwarded on to the manufacturer interface. Third, manufacturers submit quotes and the optimization algorithm is run to find a set of optimal solutions. Fourth, the user adjusts the preference on cost, time, and quality (CTQ) to evaluate different solution sets and determine an optimal choice.

Customer interface 12 is where the user interacts with the framework to submit production requests and receive notifications once a list of possible production schemes are evaluated by the framework. For this purpose, an RFQ interface for the input of user requests, a feature extraction module to assist the user with the input, and a visualization interface to present the possible production schemes is developed. This interface design enables the user to submit production requests with the abstracted data formats used in the framework.

RFQ format is important to assess the needs of the user, thus this interface captures the required data to create the manufacturer surveys which will be used to notify manufacturers about the available service requests. In an example embodiment, the RFQ interface captures data about the following: name of the project; deadline for the quote submission; deadline for receiving the order; batch size for the product; preferences on CTQ; and encoded product features (EPF). An example implementation for the RFQ interface is shown in FIG. 2. In addition, the user can access the feature extraction module described below through the RFQ interface to abstract the design features and create the EPF.

EPF is an abstracted data format that describes the product to be manufactured while preserving IP and enabling efficient data sharing. The abstracted data blocks are called features and associate each feature with an individual process. A feature is a subset of the model's geometry and in most commercial software, features are readily available as drawing objects (e.g. boss/extrudes, holes, chamfers). Definition and use of features encodes the engineering design data into an abstracted format so that the actual sensitive data (i.e. drawing document) does not have to be shared with multiple manufacturers in the system. Abstraction not only to preserves IP, but also provides an effective data format for the manufacturers to comprehend the requirements without a drawing, and efficiently respond for the service they are asked to provide.

Figure 3:
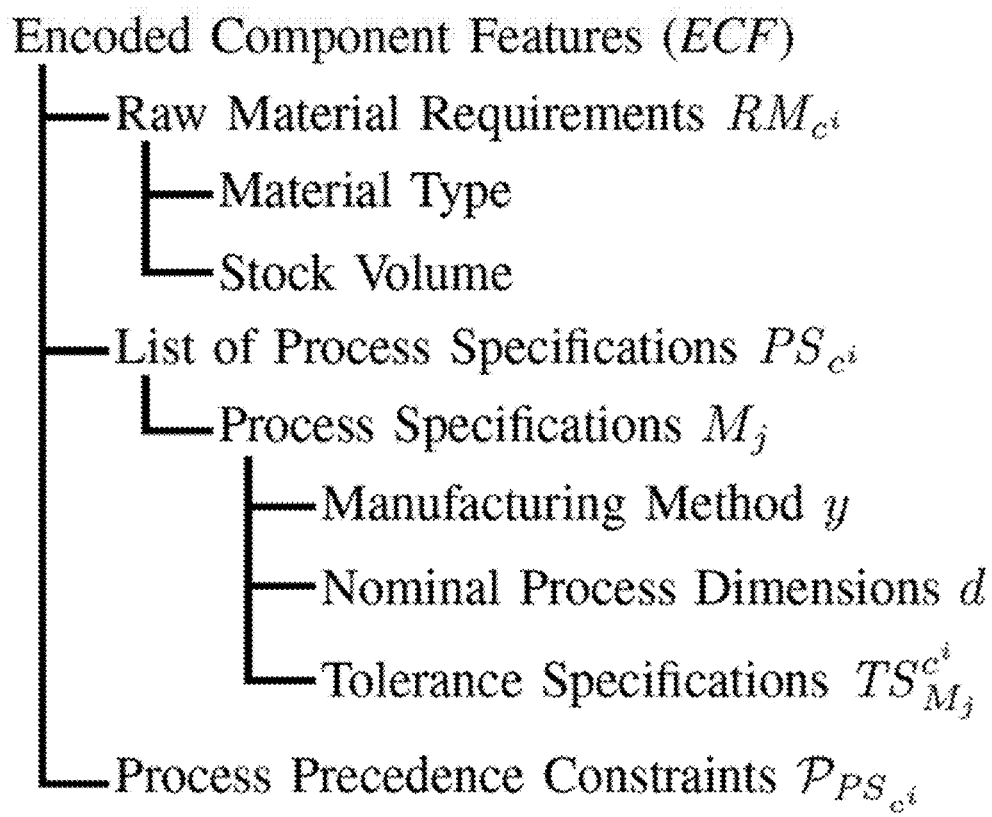
FIG. 3 depicts an example structure of the abstracted ECF format, for component $c^i$.

In the example embodiment, the EPF={$ECF_{c^i}$=1, ..., |c|} is made up of a list of Encoded Component Features (ECF) for each component in C. FIG. 3 shows the hierarchical structure of the ECF data format. To effectively and efficiently assess the kind of data to be abstracted from a CAD file, a product is broken down into individual components. An $ECF_{c^i}$={$RM_{c^i}$, $PS_{c^i}$, $P_{PS_{c^i}}$} represents predefined attributes of the component $c^i$ in the design, including but not limited to raw material requirements (e.g., a type of material for the given component and a nominal volume for the material), a list of process specifications, and precedence constraints for the manufacturing process. Raw material requirements $RM_{c^i}$ denotes the material type and volume. Together, these data would give the manufacturer a good estimate of the size of the component and the manufacturing method to apply. This is understood as being exemplary such that the RFQ format and/or the EPF can include other attributes.

The list of Process Specifications $PS_{c^i}$={$M_1$, ..., $M_n$} denote the list of required processes to manufacture the identified features. Each process may further specify nominal dimensions for the manufacturing process and a tolerance specification for the manufacturing process. That is, the Process Specification $M_j$=(y,d,$TS_{M_j}^{c^i}$) defines the manufacturing method y, nominal process dimensions d, and tolerance specifications $TS_{M_j}^{c^i}$ for a single process, where each feature has a process specification and $TS_{M_j}^{c^i}$={$\mathcal{T}_0$, ..., $\mathcal{T}_l$} is the list of tolerance specifications for process $M_j$. A process tolerance is abstracted as $\mathcal{T}_k$={$\mathcal{T}^{ID}$, $\mathcal{T}_{type}$, $\mathcal{T}_{dim}$, $\mathcal{T}_{UD}$, $\mathcal{T}_{LD}$)} where $\mathcal{T}^{ID}$ denotes the unique ID of the tolerance, $\mathcal{T}_{type}$ denotes the type of tolerance (i.e. concentricity, fitting), $\mathcal{T}_{dim}$ defines a central limit (CL) for the tolerance, and ($\mathcal{T}_{UD}$, $\mathcal{T}_{LD}$) denote the acceptable upper (USL) and lower (LSL) deviation from the central limit. For example, a through hole in component $c^i$, has $M_j$ as a) a drilling operation y, b) hole diameter d, and c) engineering tolerances $TS_{M_j}^{c^i}$ associated with the dimension. With this abstracted data, a manufacturer can estimate the tooling cost and manufacturing time to provide a production quote.

Process Precedence Constraints $P_{PS_{c^i}}$, denote the precedence relations among the set of required manufacturing processes $PS_{c^i}$ for the component $c^i$.

Furthermore, define the union of the requested processes (services) in $PS_{c^i}$ for all components in C as the set $\mathbb{P}_c$. Therefore, $\mathbb{P}_c$={$p_i | \in PS_{c^i}, \forall_{c^i} \in C$} is the union of all $M_j$ from all the components in the EPF. Note that $p_i \in \mathbb{P}_c$ is a unique abstraction of each $M_j$, and $p_i$ is used in the mathematical formulation instead of $M_j$.

Feature extraction software is incorporated in the customer interface 12, enabling the user to submit 2D or 3D drawings of the requested product to create the EPF. The extraction process has been automated in a non-trivial method using the feature extraction software to improve ease of use. One of the key contributions of this disclosure is the definition of features that creates a mapping between the geometry and the manufacturing method to produce the geometry. After the EPF is created, the design of the user is represented with this abstracted format within the framework. This practice increases the security within the framework while reducing the file format interfacing issues between different CAD platforms.

In the example embodiment, the feature extraction logic is given in Algorithm I below. Geometric features from the CAD are extracted automatically, and the user is prompted to select/input required information. This method uses existing feature recognition software to leverage the existent knowledge in computer graphics, and to help the users with little experience in the field of CAD. Thus, the parsing of EPF data can be implemented on the well-known CAD APIs. This way, the abstraction methodology is kept lightweight and is adaptable for different platforms and possible future extensions.

| Algorithm 1 Feature Extraction Module |
| --- |
| 1:    Get the components list C from the CAD |
| 2:    for each $c^i \in$ C do |
| 3:       Get raw material requirements $RM_{c^i}$ |
| 4:       Get the list of features from CAD |
| 5:       Prompt the user to select features from the list. |
| 6:       for each feature selected by the user do |
| 7:          Get the nominal dimension d |
| 8:          Request y from a drop-down list. |
| 9:          Get the list of dimensions in the feature |
| 10:         Prompt the user to select dimensions from the list. |
| 11:         for each dimension selected by the user do |
| 12:            Get tolerance specification data $\mathcal{T}$ from CAD |
| 13:            $TS_M^{c^i} \leftarrow \mathcal{T}$ |
| 14:         end for |
| 15:         M $\leftarrow$ (y, d, $TS_M^{c^i}$) |
| 16:         $PS_{c^i} \leftarrow PS_{c^i} \cup$ M |
| 17:       end for |
| 18:       $ECF_{c^i} \leftarrow (RM_{c^i}, PS_{c^i}, P_{PS_{c^i}})$ |
| 19:       ECF $\leftarrow$ ECF $\cup ECF_{c^i}$ |
| 20:    end for |

Note that this logic is compatible with both 2D and 3D designs. For 2D drawings, user is asked to identify the group of dimensions that constitute the geometry of a feature on line 4, and since the rest of the abstraction does not depend on the geometry of the design, the EPF can be created from the 2D file with user inputs.

In current practice, feature recognition software is often coupled with material cost and tooling cost to estimate production time and cost. There are well established standards and practices for encapsulating the geometry, feature recognition, product life-cycle data, and even the manufacturing process requirements in CAD exchange. Computer aided process planning (CAPP) using CAD feature recognition data and production data is documented in the literature. There are also recent efforts for data exchange formats supporting geometric tolerances in 3D models, such as the AP242 data format. In this disclosure, a new method is employed on top of existing CAD frameworks with feature recognition software to efficiently abstract the EPF data structure out of 2D or 3D models.

Determining the precedence relationship between manufacturing processes requires expertise on manufacturing processes and is not trivial. It is assumed that an engineer with experience on manufacturing assigns the precedence constraints $PS_{c^i}$ for the EPF using the customer interface 12.

Figure 4:
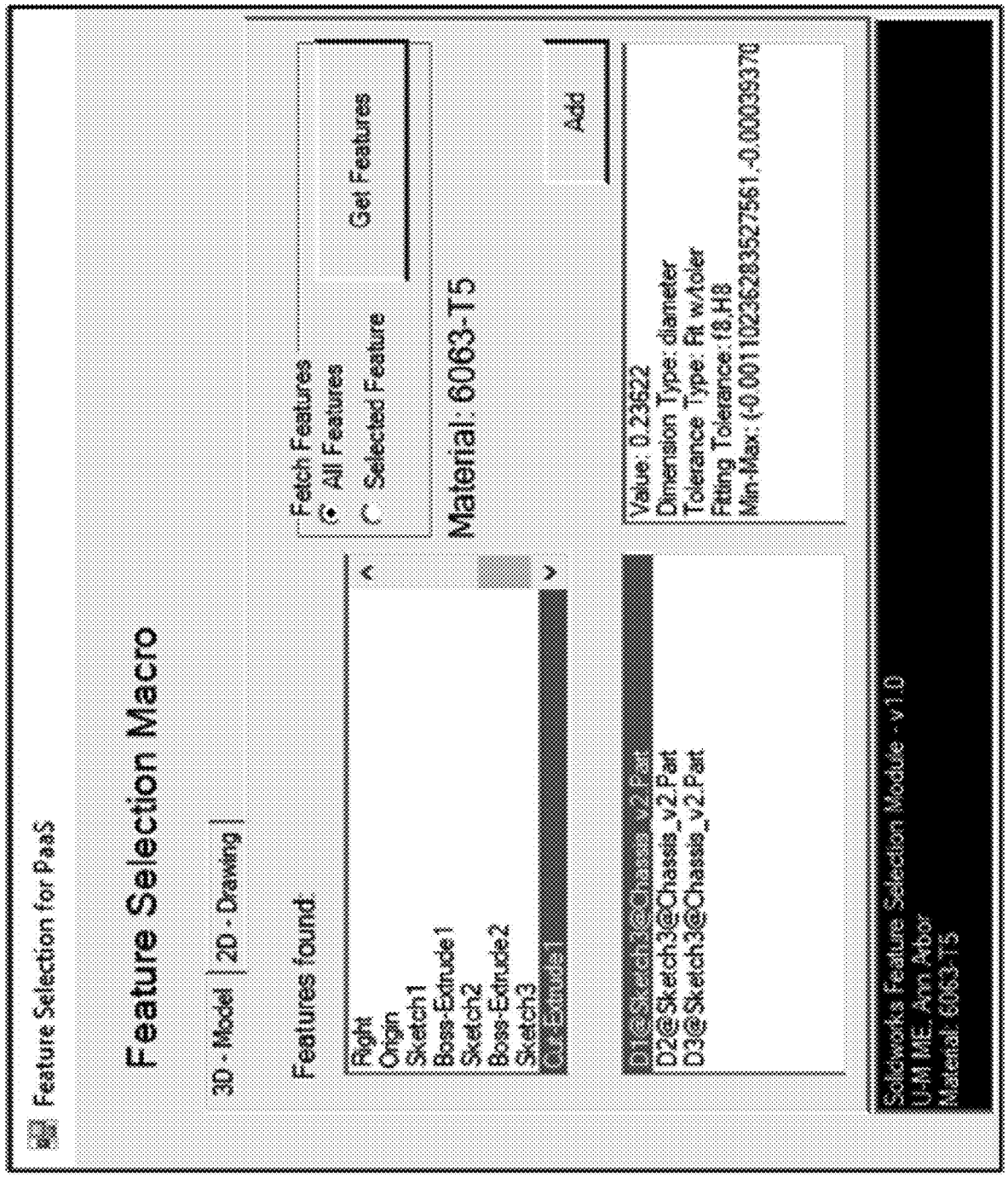
FIG. 4 illustrates an example user interface for the feature extraction module, where the user chooses the dimensions to include in the EPF and specifies the manufacturing method and stock size for the feature.

In one example, the feature extraction method is implemented using the API framework of Solidworks® (SW) CAD computer program. The feature extraction software prepares a list of features in the SW model and extracts the material properties $RMc^i$. The user is prompted to include features (from the extracted list of features in the CAD) in the EPF and specify the $y_j$. The tolerance $\mathcal{T}$ is extracted from the model using the SW API. The value $\mathcal{T}_{dim}$, $\mathcal{T}_{type}$, and min-max $\mathcal{T}_{UD}$, $\mathcal{T}_{LD}$ displayed in FIG. 4 are parsed to create the tolerance specification data. When using a 2D drawing, the user is prompted to specify the material, and the dimensions that constitute a geometric feature for manufacturing.

RFQs are sent to the manufacturers who respond with the necessary data (quotes) as will be further explained below. After parsing the manufacturing data, feasible production schemes evaluated by the framework as given above are presented to the user through a visualization interface of the customer interface 12. The user may vary the CTQ to visualize different solutions according to the given specific CTQ triple.

FIG. 5 shows an example visualization interface. As the user changes the CTQ weights using the bar on the top of the screen, a different set of 10 solutions for the specified CTQ are displayed on the left. The weights on the top are the CTQ weights scaled to integer values. The plot on the center is the time of solutions versus the cost of solutions, where the size of each circle is associated with the quality index of the solution. On the right column, the number of manufacturers associated with the solution, total CTQ, and the details of individual quotes are displayed.

Manufacturer interface 13 is where the manufacturers interact with the PaaS framework 10 to receive notifications of available jobs, and submit production quotes with the required data. Manufacturer interactions with the interface can be broken down into two main categories: notification of user request and submission of manufacturing quotes.

For notification of user request, once the service request of the user is processed, the manufacturer surveys (MFS) are created by the production quote API in the back-end service engine 14 using the RFQ data. Manufacturer surveys are then forwarded to the respective manufacturers with adequate capabilities. Notification is through a manufacturer profile on which the manufacturer can check the previously submitted quotes and available user requests.

For submission of manufacturing quotes, when a manufacturer decides to submit a quote for one or multiple processes associated with the request, a response to the MFS is submitted. The responses are received and formatted as raw quotes (RQ) and quality surveys (QS) by the manufacturer interface, and pushed to the back-end service engine 14 for further processing.

In the example embodiment, the raw quotes RQ=($\vec{p}$, $\vec{y}$,k,t,m,mfr$^{ID}$) captures the essential quote data, where $\vec{p}$: List of processes $\vec{p} \subseteq \mathbb{P}_c$.
$\vec{y}$: List of manufacturing methods
k: Cost of the quote
t: Processing time
m: Minimum utilization rate
mfr$^{ID}$: Manufacturer ID $\vec{p} = \{p_1, \ldots, p_n | p \in \mathbb{P}_c\}$ may include a single process, or multiple processes associated with the quote. The minimum utilization rate m defines a lower limit for the validity of the quote when it is utilized for batch sizes less than the total batch size. In the MFS, manufacturers are asked to specify the minimum valid batch size for the submitted quote, and the rate m is evaluated as the specified minimum batch size over the user defined total batch size.

To efficiently anticipate the quality of the requested manufacturing service, manufacturers are asked to specify the process capabilities when submitting a quote to the framework. The process capabilities associated with the quotes are captured in the quality survey QS data structure. This data is further analyzed in conjunction with the EPF data to evaluate the quality index of the production quote. The QS includes process capabilities for each T specified for the processes associated with the submitted quote. Thus, define QS=$\{(\mu_T, \sigma_T | \forall T \in \vec{p}_i\}$, where $\mu_T$, $\sigma_T$ are the process mean and variability in terms of standard deviation.

Statistical process data is used for estimating the quality of the individual quotes. The $C_{pk}$ measure, process capability index, is used in statistical process control to estimate the capability of a process to stay within the specified upper and lower bounds, including the cases when the central limit is not centered between the bounds. ($\mu_T$, $\sigma_T$) specified by the manufacturer and ($\mathcal{T}_{UD}$, $\mathcal{T}_{LD}$)$\in \mathcal{T}$ specified by the design are used to compute the index.

$$C_{pk}(\mathcal{T}) = \min\left[\frac{\mathcal{T}_{UD} - \mu_T}{3\sigma_T}, \frac{\mu_T - \mathcal{T}_{LD}}{3\sigma_T}\right] \quad (1)$$

Evaluated $C_{pk}$ index correlates to a yield percentage according to the six sigma regulations. The resulting yield is assigned to the quote RQ in discussion as the quality index q. The use of $C_{pk}$ and its relation to the yield percentage is further described by T. Pyzdek and P. A. Keller in *The Six Sigma Handbook*, McGraw-Hill Education New York 2014. The target value $\mathcal{T}_{dim}$ is used in the quoting process for the manufacturers to estimate their process capabilities in terms of ($\mu_{T_j}$, $\sigma_{T_j}$) around the given target and specified (USL, LSL). The estimate of the manufacturer may depend on the past statistical data with similar processing conditions, or a manufacturer may choose to test the process capabilities of a specific resource for the specified target tolerance. Tolerance guidelines associated with the manufacturing methods in $\vec{y}$ are used when a manufacturer does not have sufficient statistical process data available when submitting the quote.

FIG. 6 shows how the user submitted quote data is forwarded to the manufacturer's profile page. Manufacturer specifies k, t deadline for the validity of the quote, and m for the specified batch size. The manufacturer selects processes $\vec{p}$ (the list on the left) to quote for, $\vec{y}$ for each specified process, and the ($\mu_{T_j}$, $\sigma_{T_j}$) pair for the user specified tolerance.

A genetic algorithm (GA) is proposed for evaluating optimal and feasible production schemes using the quotes submitted to the PaaS framework 10. An optimization module in the back-end service engine 14 uses the quotes submitted to the system to evaluate feasible and optimal production schemes according to the weights on CTQ specified by the user. In some embodiments, the GA optimization is extended by adding a batch splitting optimization to enable multiple manufacturers to work in parallel for some or all of the services as further described below.

Here, an optimization model is formulated for the evaluation of a list of quotes that span the requested production services. Abstraction of a quote RQ is defined as s=($\vec{p}$,k,t,q,m,mfr$^{ID}$,s$^{ID}$) where q is the quality index, and s$^{ID}$ is the unique quote ID. Note that this abstraction is created using the RQ and the QS data formats.

Let S=[$s_1, \ldots, s_n$] denote a feasible list g of quotes where; $s_1 \in \mathbb{D}$ denotes a manufacturing quote, and $\mathbb{D}$ is the set of all quotes. S is said to be feasible if and only if:

(a) The precedence of the quotes in S satisfies the process precedence constraints $\mathcal{P}_{\mathbb{P}_c}$, defined on set $\mathbb{P}_c$.

(b) The quotes in S include all the requested processes in the set $\mathbb{P}_c$.

where $\mathcal{P}_{\mathbb{P}_c} = \{\cup \mathcal{P}_{p_s{c_i}} | \forall c_i \in C\}$ denotes the union of all the precedence constraints on individual components, including assembly precedences. Therefore $\mathbb{P}_c = \text{span}\{\vec{p}_1, \ldots, \vec{p}_{|s|}$ $\vec{p}_i \in s_i, \forall s_i \in S\}$ must hold by (a) for each feasible S. One can partition $\mathbb{P}_c$ for each $c^j \in C$ to define $X_{c^j}=\{s_j, \ldots, s_k\}$ which denotes the production quotes associated only with $c^j$. Then, $$S=\{X_{c^i} \mathring{A} \ldots \mathring{A} X_{c^j}\}$$

is an alternate representation which is used in evaluating component-wise processing time. Note that the feasibility condition must hold for all feasible solution candidates, and does not require $\vec{p}_1 \in S$ to be mutually exclusive, allowing a service to appear in multiple quotes in the solution. This enables manufacturers to work in parallel for improved production cycle times. This point onward, any mention of the term solution refers to only feasible solutions unless stated otherwise.

Furthermore, the type of solutions in this disclosure can be categorized into two groups. Single manufacturer per process (SMPP) is a type of solution which allows only one manufacturer to be assigned to a requested manufacturing service. Thus, the batch size for each of the quotes is the total batch size. In contrast, multiple manufacturer per process (MMPP) is a type of solution allows the assignment of multiple manufacturers per requested manufacturing service. This solution type allows potentially faster production cycles with multiple manufacturers working in parallel for the bottleneck processes in the single manufacturer per process scenario.

Let $\mathcal{L} \in \mathbb{R}^{(n+1)\times(n)1}$ be a distance matrix between the n manufacturers that contributed (single or multiple quotes per manufacturer) to $\mathbb{D}$ and the user. Then, $\mathcal{L}(i,j)$ denotes the distance between manufacturers i and j. Define $J_c(S)$ as the cost function;

$$J_c(S)=\Sigma_{i=1}^g b_i[k_i+\zeta_k \mathcal{L}(s_i^{ID},s_j^{ID})]$$

where $b_i$ is the optimal batch size percentage, $\zeta_k$ denotes the unit transportation cost, and $s_j^{ID}$ denotes the next manufacturer to ship the processed goods, which is defined according to the precedence constraints. Note that for the last process, $s_j^{ID}$ is the user's location.

$J_T(S)$ is the time function representing a generalized time model for a production scheme with possible assemblies;

$$J_T(S)=\text{argmax}\{U_c 1(S), \ldots, U_c k(S) | c^i \in C\} + t^*_{asm},$$

$$U_c k(S)=\Sigma_{i=1}^{|X_{c^k}|}(\tau_i)+\zeta_t \mathcal{L}(mfr_{|X_{c^k}|}^{ID}, mfr_{asm}^{c^k})$$

where $\tau_i$ is the time for completing the list of services $\vec{p}_i \in s_i$, where $s_i \in X_{c^k}, s_{asm}^k$ is the assembly location for $c^k$, $\zeta_t$ is the unit transportation time, and $t_{asm}$ is the time for the total assembly. Thus, $U_c k(S)$ is the time for manufacturing, and shipping $c^k$ to its assembly location.

In the example embodiment, the conditional assignment of single manufacturer per process is relaxed, and manufacturers are allowed to work in parallel. Therefore, $\tau_i$ is piecewise-defined for the two cases when (1) $\vec{p}_i \in S$ share services (MMPP), and (2) when the quotes are disjoint in terms of processes (SMPP).

$$\cap p_i \neq \varnothing, \tau_i=f_x(\bar{b}):\bar{b}=[b_1, \ldots, b_z], \quad (1)$$

$$\cap p_i=\varnothing \ \tau_i=t_i \quad (2)$$

where $f_x(\bar{b})$ is the optimal time for x quotes in parallel, and b is the vector of the batch sizes for the x quotes. Moreover, for the two types of solutions (SMPP and MMPP), it is useful to introduce:

$$T_{SMPP}=\inf\{J_T(S_i)\}: \forall S_i \in \text{SMPP},$$

$$J_T(S)_{MMPP} \leq T_{SMPP}: \forall S \in \text{SMPP} \quad (2)$$

where $T_{SMPP}$ denotes the least attainable processing time for the SMPP type solutions formed using the quotes in set $\mathbb{D}$, and Eq. 2 states that any solution of type MMPP cannot have a longer processing time than $T_{SMPP}$. The quality function $J_Q(S)$ is defined as follows:

$$J_Q(S) = \prod_{i=1}^g (q_i),$$

denotes the quality of the solution S. Since the previously assigned quality index $q_i$ denotes a yield, product of all the quality indices is the quality measure of the solution. Note that if there are additional quality inspections requested for the assembly of components, the quality function might be modified to better represent the expected quality instead of just the estimated index $q_i$.

Then one can formulate the high level optimization problem simply as:

$$\min_S J(S) = \alpha_0 \frac{J_C(S)}{\mu_{cost}} + \alpha_1 \frac{J_T(S)}{\mu_{time}} + \alpha_2(1-J_Q(S)) \quad (3)$$

subject to:

$$P(S) \subset \mathcal{P}_{\mathbb{P}_c} \quad (4)$$

$$b_i \geq m_i B, \forall b_i \in S, \quad (5)$$

where $J(S)$ is the fitness function, $\alpha_0$, $\alpha_1$ and $\alpha_2$ are the weights (implicit CTQ coefficients), $\beta$ is the size of the total batch, and $\mu_{cost}$, and $\mu_{time}$ are normalizing means. $(1-J_Q(S))$ is used since the quality should be maximized for an optimal solution. Equation 3 is the objective function to be minimized. In Eq. 4, $\mathcal{P}(\cdot)$ is used to denote the precedence scheme of the candidate solution S. Equation 5 specifies that the batch size percentages assigned to the quotes in parallel cannot be less than the minimum utilization rate specified by the manufacturer. While the cost function has been defined to include cost, time and quality, it is understood that the cost function can be defined to include other objectives including but not limited to energy use, transportation time, number of manufacturers, etc. Likewise, it is understood that the weightings will depend on the specific objectives and there may be more or less than three objectives.

Before moving to the GA formulation, a solution is defined for the batch splitting problem. A linear optimization model is posed to determine the optimal time $f_t(\bar{b})$, and batch size $b_i$ for the quotes that are utilized in parallel. Without loss of generality, split the batch of size $\beta$ between N manufacturers working in parallel for a single process $p_i$, with l destinations to ship the processed goods. Then partition each $b_i \in \bar{b}$ as;

$$b_{ij}, \text{ where } \begin{cases} i=1, \ldots, N & : \text{Source} \\ j=1, \ldots, l & : \text{Destination} \end{cases}$$

where $b_i = \Sigma_{j=1}^l b_{ij}$ is the batch size to be manufactured for quote $s_i^{ID}$, and $b_{ij}$ denote the size of the batch to be sent from manufacturer i to destination j. Moreover, define $B \in \mathbb{R}^{N \times 1}$, where $b_i = B(i,j)$. $L \in \mathbb{R}^{N \times l}$, be a matrix denoting the distances $\mathcal{L}(i,j)$, and $D \in \mathbb{R}^{N \times 1}$ be a matrix with identical l columns as costs of the quotes such that $D(\cdot,t)=[c_1, \ldots,$ $c_N]^T : \forall t$. Superscript T denotes a transpose operation. Then the objective to be minimized for minimum cost can be written as;

$$\Sigma_{i=1}^N \Sigma_{j=1}^l b_{ij}[\mathcal{L}(i,j)+k_1],$$

which is equivalently $$tr(B(L+D)^T) = [vec(L+D)]^T vec(B),$$

in matrix form. Operator vec(·) is a vectorization operation. Then a formulation to minimize the batch sizes for minimum cost is given by:

$$\min_{b_{ij}} \ [vec(L+D)]^T vec(B), \quad (6)$$

subject to:

$$\Sigma_{j=1}^l b_{ij} \geq m_i \beta, i=1, \ldots, N \quad (7)$$

$$\Sigma_{i=1}^N \Sigma_{jj=1}^l b_{ij} = \beta \quad (8)$$

$$\Sigma_{i=1}^N b_{ij} = \bar{d}_j, j=1 \ldots, l \quad (9)$$

where $\bar{d}_j$ denotes the required batch size of the destination j. Equation 7 is the minimum utilization rate constraint, Eq. 8 ensures that the total of the batches add up to) $\beta$, and Eq. 9 ensures that the total of the delivered batch size to a destination j is the required amount $d_j$ at the destination. Similarly a formulation for computing $f_t(\bar{b})$ is given by:

$$\min_{b_{ij}} \ f_t(\bar{b}) = \mathrm{argmax}\{b_{ij}t_i\} \quad (10)$$

subject to (7), (8), (9)

which computes the optimal batch sizes $b_i$ for the minimum process time, subject to the previously introduced constraints. Note that the proposed optimization models optimize the batch sizes to be manufactured by each manufacturer and the size of the batch to be sent to the consecutive manufacturers. Time and cost for the split batches are assumed to be linearly related to the original quote time and cost.

The optimization problem given by Eq. 3 requires computation of numerous candidate quotes to find an optimal solution. Since the quote data collected from the manufacturers vary for different services and manufacturers, the quote space is assumed to be highly non-smooth and non-linear. Furthermore, a feasible candidate solution S is a list of quotes, and since process precedence constraints do not pose a strict sequence of processes on the solution, the optimization needs to compute the optimal sequence as well, which creates a combinatorial problem. Lastly, the batch splitting problem needs to incorporate a sub-optimization for each of the candidate solutions, in order to find optimal batch sizes. The use of evolutionary algorithms (EA) is well suited for the optimization problem at hand. EA's are widely utilized in manufacturing literature. Genetic algorithms (GA), which is a type of EA, is well suited for problems where the solution space is large and brute-force techniques for optimization are not feasible although other methods are also contemplated by this disclosure.

FIG. 7 depicts an example method for selecting a manufacturing solution for manufacturing a product using a genetic algorithm and which is implemented by the PaaS framework 10. The proposed genetic algorithm has a custom genotype (encoding of individuals) representation $G(S)=[s_1, s_2, \ldots, s_n]$ where $s_i \in S$ denotes the $i^{th}$ gene of the individual, which is equivalently the $i^{th}$ quote in the candidate solution S. Therefore, previously defined precedence operator P(S), and fitness function (Eq. 3) J(S) are also operators for the individuals of the GA.

First, the optimization is initialized at 71 with a set of random candidate solutions (individuals) according to the previously given feasibility conditions. To do so, a set of quotes for manufacturing the product are received from various manufactures. Each quote identifies a manufacturer providing a given quote, as well as provides a listing of manufacturing processes in the given quote, a cost of the given quote, and a processing time for the given quote. A set of precedence for the manufacturing processes is also received by the optimization module. A set of candidate solutions are then generated from the set of quotes. Each candidate solution is comprised of one or more quotes which collectively account for the set of precedence, such that the one or more quotes in a given candidate solution includes each of the two or more manufacturing processes for the product. That is, there is a quote in the candidate solution that covers each of the manufacturing processes, where a quote may include more than one manufacturing processes. Details for how the candidate solutions are generated is further described below in relation to FIG. 8.

Each candidate solution in the set of candidate solutions is evaluated at 72 according to a fitness function that minimizes cost of the manufacturing solution and processing time for the manufacturing solution while maximizing quality of the product. In one embodiment, the fitness function is a weight function having a first weight, a second weight and a third weight, for example as set forth in equation (3). Values for each of these three weights is provided by the customer. The first weight pertains to a cost of the manufacturing solution, the second weight pertains to the processing time for the manufacturing solution and the third weight pertains to the quality of the product.

A genetic algorithm is iteratively applied to the set of candidate solutions and thereby yields a set of optimized solutions. For example, a stochastic uniform selection function is used at 73 to select the parents from the current generation. A predefined number of elite individuals are preserved at 74 for the next generation. Next, a crossover operation and a mutation operation are applied at 75 and 76, respectively. The crossover rate is defined in the designing stage of the algorithm. Children of the crossover operation may be checked for feasibility, for example adherence to the set of precedence for the processes. The generic operations are repeated until there is enough feasible children for the new generation. In one embodiment, a two-point crossover and a single gene mutation is used. Children of these genetic operations are added to the next generation as candidate solutions and the candidate solutions for the next generation are evaluated according to the fitness function at 72 until a stop condition is met as indicated at 77.

The genetic algorithm is terminated at 77 when the maximum number of generations is reached (MAXGEN) of the population stall for a certain number of generations (MAXSTALL). Lastly, possible solutions are selected at 78 from the last generation. In one embodiment, a predefined number of solutions are selected. For example, the best individuals (i.e., least fitness score J(S*)) of the last generation is the optimal solution S* for the optimization problem. It is to be understood that only the relevant steps of the method are discussed in relation to FIG. 7, but that other software-implemented instructions may be needed to control and manage the overall operation of the system.

An example embodiment for the genetic algorithm (Algorithm 2) is set below.

```
1:   Input: P^{𝒫_{ℙ_C}},𝔻, α_0, α_1, α_2, 𝓛
2:   GEN # = 1 ▷ Initialize population of size POPSIZE
3:   while i ≤ POPSIZE do
4:       G(S_i) = Prec(P^{𝒫_{ℙ_C}},𝔻)
5:       POP_{t_0} ← G(S_i) ▷ Append genotype to population
6:       J(S_i)     ▷ Assign fitness (Eq. 3)
7:       i ← i + 1
8:   end while
9:   while GEN # ≤ (MAXGEN or MAXSTALL) do
10:      Select m fittest S_i as parents Pa(S) for next gen.
11:      EL ← Pa(S)^{elite}  ▷ Preserve best elite individuals
12:      while size(CH) ≤ CHSIZE do
13:          S_c^{xOver} ← S_j × S_k >     ▷ Crossover the parents
14:          if 𝒫(S_c) ⊂ P^{𝒫_{ℙ_C}} then
15:              CH ← S_c^{xOver}     ▷ If the child is feasible
16:          end if
17:      end while
18:      MU ← S_i^{mut}                  ▷ Induce mutation
19:      POP_{t+1} ← EL ∪ CH ∪ MU
20:      J(S_i) :∀S_i ∈ POP_{t+1}
21:      GEN# ← GEN# + 1              ▷ Next generation
22:  end while
23:  Output: Last generation POP_{t_f}
```

In this example, the fitness function $J(S_i)$ uses $\alpha_0, \alpha_1, \alpha_2$, and $\mathcal{L}$ to evaluate a weighted sum for the CTQ. The linearized weights $\alpha_0, \alpha_1, \alpha_2$ are translation of the user input on the CTQ preference. This allows the evaluation of solutions tailored for the user preference on CTQ. Note that the function Prec creates individuals of type SMPP. To create individuals of type, MMPP, additional genes $s_\alpha$ with $\bar{p}_\alpha$ including the bottleneck process in S are added to the individual. The condition given in Eq. 2, is ensured when new genes are added.

For crossover and mutation, a stochastic uniform selection function is used in the algorithm to select the parents from the current generation. Other selection functions also fall within the scope of this disclosure. The crossover (denoted by xOver), and mutation operators are applied according to the mutation rate (denoted by mut), and crossover rate defined in the designing stage of the algorithm. In this example, a two-point crossover and a single gene mutation is utilized. The algorithm induces the genetic operators on parents until enough feasible children solutions are produced for the next generation.

Lastly, the optimization is initialized with a set of random solution candidates according to the previously given feasibility conditions (see line 2). To ensure feasibility, an individual initialization scheme using the underlying precedence constraints is proposed and illustrated in FIG. 8. In an example initialization scheme, a tracking vector is used to maintain the availability of the manufacturing processes which comprise a manufacturing solution. The tracking vector may be a one by n vector that is initialized at 81, where n is the number of is manufacturing processes comprising the manufacturing solution. The value of an element in the tracking vector indicates availability of a given manufacturing process. For example, a value of one for a given manufacturing process means that a quote including the given manufacturing process has been added to the candidate solution; whereas, a value of zero for the given manufacturing process means that a quote including the given manufacturing process has not been added to the candidate solution. Other techniques for tracking the availability of the manufacturing processes is also contemplated by this disclosure.

Availability of the manufacturing processes for inclusion in the candidate solution is determined at 82. In the example embodiment, values of the elements in the tracking vector are set in accordance with the set of precedence prior to determining availability of the manufacturing processes and thereby ensuring selection of the manufacturing processes complies with the set of precedence. For example, a given precedence may require that process p occur after process j and before process k. If the value in the tracking vector corresponding to process j is one, then the value for process k is set to one. This prevents selection of a quote which include process k while enabling the selection of a quote which includes process p.

From the available manufacturing processes, a particular manufacturing process is randomly selected at 83. For example, the manufacturing solution may call for five different manufacturing processes, one of which (e.g., process 3) is randomly selected in step 83. A quote is then selected at 84 from the set of quotes, such that the selected quote includes the randomly selected manufacturing process (i.e., process 3). The selected quote is added to the candidate solution at 85 and the tracking vector is updated accordingly at 86. For example, the selected quote will include manufacturing process 3 but may also include another manufacturing process, such a process 4. In this example, the values of the tracking vector corresponding to process 3 and process 4 are updated (i.e., set to one).

These steps are repeated as indicated at 87 until the particular candidate solution includes each of the two or more manufacturing processes. Once the particular candidate includes all of the n manufacturing processes, then it is added at 88 to the set of candidate solutions. In this way, a set of candidate solutions are generated from a set of quotes. It is to be understood that only the relevant steps of the method are discussed in relation to FIG. 8, but that other software-implemented instructions may be needed to control and manage the overall operation of the system.

An example embodiment of this initialization scheme (Algorithm 2) is set below.

```
1:   function PREC (𝒫_{ℙ_C}, 𝔻)
2:       Input: 𝒫_{ℙ_C} = (Ī_{ℙ_C}, Ē_{ℙ_C}, M̄_{ℙ_C}), 𝔻
3:       Individual G(S) = {}          ▷ Initialize the individual
4:       R = [0]^{1×n}, n = |ℙ_C|      ▷ Keep track of the processes
5:
         Pick random index i^{Y_x} ∈ Ī_{ℙ_C}
6:       Pick s_p ∈ 𝔻, such that Y_x ∈ p̄_i
7:       G(S) ← G(S) ∪ s_p              ▷ Append the first gene
8:       R(x) ← 1                       ▷ Mark used index
9:       while R ≠ [1]^{1×n} do
10:          K ← R
11:          for all (j, p, k) ∈ Ē_{ℙ_C} = {ē_{j,Y_k}^{Y_p}} do
12:              if R(j) = 1 then
13:                  K(k) ←             ▷ need p, j first, lock k
14:              else if R(j, p, k) = 0 then
15:                  (K(p), K(k)) ← 1   ▷ lock p, k
16:              end if
17:          end for
18:          for all (a, b, c) ∈ M̄_{ℙ_C} = {m̄_{Y_a,Y_c}^{Y_b}} do
19:              if R(a) = 1 then
20:                  Choose x as b, go to 28   ▷ Break
21:              else if R(b) = 1 then
22:                  Choose x as c, go to 28   ▷ Break
```

```
23:        else if R(a, b, c) = 0 then
24:            (K(b), K(c)) ← 1           ▷ lock b, c
25:        end if
26:     end for
27:     Pick random index x from zeros of K
28:     Pick $s_p \in \mathbf{D}$ such that $x \in \bar{p}_i$
29:     $G(S) \leftarrow G(S) \cup s_p$    ▷ Append the next gene
30:     R(x) ← 1                           ▷ Mark used index
31:   end while
32:   Output: G(S)
33: end function
```

In the case of MMPP, in order to evaluate $J(S_i)$, optimal batch sizes must be evaluated first. FIG. 9 illustrates a method for evaluating candidate solutions during the initialization scheme. For a given candidate solution, a bottleneck manufacturing process is identified at 91. In one embodiment, the bottleneck manufacturing process is the process having the longest process time. Another quote is selected randomly at 92 from the set of quotes, where the selected quote includes the bottleneck manufacturing process. The selected quote is then appended at 93 to the particular candidate solution. This process can continue until a stop condition is met as indicated at 94. In this example embodiment, process continues until the solution time of the candidate solution is less than a threshold or a maximum number of quotes allowed is reached. Once one of the stop conditions met, the particular candidate solution is added to the set of candidate solutions.

To solve the batch splitting problem, the fitness function is evaluated differently using a linear programming (LP) solution. Note that the batch-splitting problem is defined process-wise, between N manufacturers with k destinations. To solve this problem, batch sizes are computed in reversed process-order, from the last process to the first; last process having the destination as the user, and each preceding process having the destination as the following one. Depending on the greater weight $\alpha_0$ or $\alpha_1$ optimal batch sizes are computed according to Eq. 6 or Eq. 10 respectively. If the LP is infeasible, $J(S_i) \leftarrow \mathcal{O}$ is assigned, where $\mathcal{O}$ is a very large number. The condition is added to force the individuals towards the feasible LP region.

With reference to FIG. 10, an example embodiment for the back-end service engine 14 is further described. The back-end service engine 14 includes three efficient APIs: Decision API 101; Production Quote API 102 and Analysis API 103. The user submits new RFQ data. The data is pushed to the Production Quote API 102 which creates the EPF. After creating EPF, the Production Quote API 102 queries the database for matching manufacturing capabilities and sends MFSs. Analysis API 103 uses RQ and QS to assign quality indices to the quotes and create the set ID. Decision API 101 uses the ID, location data, and EPF to evaluate optimal solutions. The solutions are presented to the user through the visualization interface, and the user can change the preference on CTQ to examine different solutions lists.

For the Production Quote API 102, inputs are RFQ and the manufacturer list from database; whereas, outputs are EPF and MFS. After receiving the RFQ data from the front-end, the Production Quote API 102 creates the EPF data format. To create the EPF, the data from the feature extraction module is used with the other RFQ data, such as the requested batch size. The Production Quote API 102 sits in the middle of the back-end, managing most of the important data communication with the database in the storage layer, manufacturer interface, and the Analysis API 103. Created EPF are stored in the user profiles for the users to access previously submitted requests.

MFS forms are also created by the Production Quote API 102. The EPF encapsulates the required technical data for creating MFS, while the RFQ data supplies requirements like the name of the project, deadline of the project, and any additional notes for the manufacturers. The Production Quote API 102 uses $\mathbb{P}_c$ to create a list of manufacturing methods that are proposed for the manufacturing of the requested product. A list of manufacturers with matching manufacturing capabilities are then queried from the database, and the MFS are forwarded to those manufacturers. The user's initial preference on CTQ is also shared with the manufacturers through the MFS.

For the Analysis API 103, inputs are EPF, RQ, and QS; whereas, the output is $\mathbb{D}$. Analysis API uses the RQ, QS and EPF data to do the quality index (q) assignment introduced above. After the quality q index is evaluated, each of the quotes in RQ format is abstracted into the quote format s introduced in the problem formulation above to create the set of optimization quotes $\mathbb{D}$ for the decision maker. Additionally, the RQ and QS taken from the manufacturers is pushed to the database through the Analysis API.

For the Decision API 101, inputs are $\mathcal{L}$, EPF, and $\mathbb{D}$; whereas, the output is Solutions. Using the distance matrix $\mathcal{L}$, set of quotes $\mathbb{D}$, and the process precedence constraints $\mathcal{P}_{\mathbb{P}_c}$ which is captured by EPF data structure, and the user preference on CTQ, Decision API 101 runs the proposed GA to evaluate feasible and optimal solutions. Note that a list of solutions is presented to the user rather than a single optimal solution. A list of 10 best solutions for every combination of $\{(\alpha_0, \alpha_1, \alpha_2) | \alpha_0 + \alpha_1 + \alpha_2 = 1; \alpha_0, \alpha_1, \alpha_2 \in 0.1i, i \in \mathbb{Z}_+\}$ is precomputed by the Decision API so that the visual interface can call different sets of solutions for various CTQ, with minimal latency.

Given information flow explains how the needs of the user are interpreted and translated in a quantitative format, which is anonymized and abstracted for IP protection and efficiency. The response of the manufacturers is used for predicting the process quality and evaluating optimal production schemes for the user. The decision maker abstracts the whole information flow as a mathematical model, and uses the proposed GA to solve the optimization problem in order to compute the proposed production schemes.

The system described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

Next, a simulated case study and example solutions using the implementation of the PaaS framework 10 is presented. With reference to FIG. 11, the case study for a model truck is prepared to demonstrate the proposed capabilities of the PaaS framework 10. The model truck has 7 parts and 4 different components; four wheels, a cabin, a trunk, and a chassis. Required processes to manufacture the truck are as follows:

1) Machining (face milling and drilling) of the chassis
2) 3D printing of the trunk
3) 3D printing of the cabin
4) 3D printing of the four wheels
5) Assembly of the components The quotes in this case study are collected through on-line channels (3Dhubs.com®, shapeways.com®, makexyz.com®, MFG.com®, xometry.com®), and the 3D Lab at the University of Michigan. Quotes are requested for the production of a single truck ($\beta=1$), in order to eliminate the effect of non-standardized discounts applied by some of the on-line channels for increasing batch sizes. A total of 37 quotes were collected for the 3D printed parts and 3 quotes were collected from machining suppliers. Additional quotes for the machining process were generated using a Gaussian distribution of cost and time around standard process guidelines for machining. A total of $|\mathbb{D}|=129$ quotes from 110 manufacturers including the actual manufacturers are used in the simulated case study with a batch size of $\beta=100$. AM quotes were collected for polymer based methods. Fused deposition modeling (FDM) was used by most of the manufacturers. Layer height info for the 3D printing processes are used to estimate the quality of the 3D printing quotes (less height is better quality), and their average is used in the combined solution since layer height does not denote the yield of the process. This approach is adopted since various manufacturers include different metrics in their quotes, and the layer height was the only metric that was included in every quote. The design of the model truck allows easy assembly of its components, thus all the manufacturers are assumed to be capable of performing the required assembly, and the assembly is not considered to be a separate process. A partial ECF for chassis is given in Table II.

TABLE II

| | | Partial ECF for Chassis, All dimensions in mm. | | |
|---|---|---|---|---|
| $ECF_c^1$ | $RM_c^1$ | Material | | Aluminum |
| | | Nominal Volume | | 76.2 × 50.8 × 25.0 |
| | $PS_c^1$ | Process | Manufacturing Method y | Drilling |
| | | $M_1$ | Process Dimensions $d_1$ | $\Phi 6.0 \times 50.8$ |
| | | | Tolerance $\mathcal{T}_1$   ID | 1 |
| | | | Specifica-   $\mathcal{T}_{type}$ | Fitting |
| | | | tions $TS_{M_1}$   $\mathcal{T}_{dim}$ | 6.0 |
| | | | $\mathcal{T}_{UD}$ | +0.2 |
| | | | $\mathcal{T}_{LD}$ | −0.2 |
| | $P_{PSc}^1$ | $\underline{I}_c^1$ | | $i^{p1}$ |
| | | $\underline{E}_c^1$ | | — |
| | | $\overline{M}_c^1$ | | — |

The set of components is defined as $C=\{c^1,c^2,c^3,c^4\}$, and set of requested processes $\mathbb{P}_c=\{p_1,p_2,p_3,p_4\}$ denoting the machining of job of the chassis ($p_1$), and the 3D printing of the remaining components ($p_2,p_3,p_4$). Instead of queuing the processes in the given order (strict precedence), he relaxed precedence scheme given in Algorithm 3 with $\mathcal{P}_{\mathbb{P}_C}^{rix}=(\{i^{p_1}, p^{p_2}\}, \{\overline{e}_{p_2,p_4}^{p_3}\}, \{\ \})$ was used in the simulated case study. The use of loose constraints enables the combination of different precedence schemes, which in turn allows the optimization to evaluate better solutions (in terms of fitness score of the solution) when compared to the strict precedence constraints.

To illustrate the proposed functionalities of PaaS, three example solutions are presented in this case study:
- $S_1$: SMPP solution with random quotes that the user might choose without using the Paas platform.
- $S_2$: SMPP computed by the decision maker for balanced CTQ $(\alpha_0, \alpha_1, \alpha_2) = (0.32, 0.34, 0.33)$.
- $S_1$: MMPP computed by the decision maker for minimum time $((\alpha_0, \alpha_1, \alpha_2) = (0,1, 0)$.

Constraints used for the case study are:

$$\beta = 100, \zeta_K = 0.75\left(\frac{\$}{km}\right), \zeta_t = 0.0029 \text{ (day/km)},$$

and m=0.4 is arbitrarily chosen for all the quotes.

The random solution was created by picking reasonable (not the worst possible solution, balanced importance on CTQ) quotes for a feasible solution yields ($J_c(S_1)=\$190.30$, $J_T(S_1)=11.72$ days, $J_Q(S_1)=45.27\%$. $S_1$ denotes a baseline solution for our case study. $S_2$ is a balanced CTQ weights solution, to present a comparable result to the random solution $S_1$. Following is $S_2=[s_1,s_2,s_3]$:
- $s_1$:[(2,3), 28.26, 6.0, 0.4, 52.5, 104, 124]
- $s_2$:[(1), 32.42, 3.62, 0.4, 64.3, 14, 19]
- $s_3$:[(4), 25.00, 3.00, 0.4, 95.0, 110, 122]

and this solution yields $J_c(S_2)=\$114.29$. $J_T(S_2)=9.73$ days, $J_Q(S_1)=70.6\%$. Even without inducing the batch splitting problem, a 25.2% improvement in the solution was demonstrated using the GA, in terms of the fitness scores $J(S_1)$ and $J(S_2)$. Note that this rate of improvement is a rough lower bound for the improvement since reasonable quotes are hand picked from a large list of quotes, which is not the case for a user reaching a few manufacturers and collecting quotes. Moreover, by experimenting with the GA, computer $T_{SMPP}$=6.68 days.

Next the effect of batch splitting is shown with the solution $S_3$. FIG. 12 illustrates the output of the solution in terms of batch splitting. Manufacturer 11 ships $b_{ij}=b_{11, 40}=45.69\%$ to the manufacturer and will produce a total of $b_i=b_{11}=45.69+7.31=53\%$ of the total batch for process 1. Similarly, manufacturer 14 will produce $b_i=b_{14}=47.00\%$ of the total batch and send it all to manufacturer 104. $S_3$ yields $J_c(S_2)=\$254.779$, $J_T(S_2)=4.725$ days, $J_Q(S_1)=57.76\%$, which is a 51% improvement over $S_2$ in terms of the production time. Note that the time span of $S_3$ is less than $T_{SMPP}$, since it is MMPP type. FIG. 13 shows a generation plot of the proposed GA, for the MMPP type solutions. The dashed blue lines are the mean fitness score of each generation, and the red solid dots are the best score of each generation. It is realized that a 22-65% improvement for the optimal solutions of GA over the initial random population (generation 0).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for selecting a manufacturing solution for manufacturing a product for a customer, where the manufacturing solution is comprised of two or more manufacturing processes, comprising:
   receiving a set of quotes for manufacturing the product, where each quote identifies a manufacturer providing the given quote, provides a listing of manufacturing processes in the given quote, a cost of the given quote, and a processing time for the given quote;
   receiving a set of precedence for the manufacturing processes which comprise the manufacturing solution;
   receiving values for a first weight, a second weight and a third weight from the customer, where the first weight, the second weight and the third weight have different values, and the first weight pertains to cost of the manufacturing solution, the second weight pertains to the processing time for the manufacturing solution and the third weight pertains to the quality of the product;
   generating a set of candidate solutions from the set of quotes, where each candidate solution accounts for the set of precedence and is comprised of one or more quotes, such that the one or more quotes in a given candidate solution includes each of the two or more manufacturing processes for the product;
   iteratively applying a genetic algorithm to the set of candidate solutions by evaluating each candidate solution in the set of candidate solutions according to a fitness function that minimizes cost of the manufacturing solution and processing time for the manufacturing solution while maximizing quality of the product and thereby yielding a set of optimized solutions,
   wherein the fitness function is a weight function having the first weight, the second weight and the third weight and each candidate solution in the set of candidate solutions is evaluated according to the fitness function using the values for the first weight, the second weight and the third weight;
   presenting the set of optimized solutions for the product to the customer;
   selecting an optimized solution from the set of optimized solutions; and
   manufacturing the product in accordance with the selected optimized solution.

2. The method of claim 1 wherein generating a set of candidate solutions further comprises
   determining availability of each of the two or more manufacturing process for inclusion in a candidate solution, where availability of a given manufacturing process complies with the set of precedence;
   randomly selecting a particular manufacturing process from the available manufacturing processes;
   selecting a quote from the set of quotes, where the selected quote includes the randomly selected manufacturing process;
   appending the selected quote to a particular candidate solution;
   repeating steps of this claim until the particular candidate solution includes each of the two or more manufacturing processes; and
   adding the particular candidate solution to the set of candidate solutions.

3. The method of claim 2 wherein availability of the two or more manufacturing processes is maintained using a tracking vector, where value of an element in the tracking vector indicates availability of a given manufacturing process and number of elements in the tracking vector corresponds to number of manufacturing processes comprising the manufacturing solution.

4. The method of claim 3 further comprises setting values of elements in the tracking vector in accordance with the set of precedence prior to determining availability of the two or more manufacturing processes, thereby ensuring selection of the manufacturing processes complies with the set of precedence.

5. The method of claim 1 further comprises
selecting parents from the set of candidate solutions for a next generation of the genetic algorithm, where the selection of parents uses output of the fitness function evaluated for each candidate solution.

6. The method of claim 5 wherein iteratively applying a genetic algorithm to the set of candidate solutions includes applying a crossover operation to the selected parents and applying a mutation operation.

7. The method of claim 5 wherein evaluating each candidate solution further comprises
identifying a bottleneck manufacturing process in the particular candidate solution;
selecting another quote from the set of quotes, where the selected quote includes the bottleneck manufacturing process; and
appending the another quote to the particular candidate solution.

8. The method of claim 1 further comprises
receiving, by a production quote interface, a request for quote for manufacturing the product from the customer, where the request for quote incudes design data for the product and the design data is extracted from a computer-aided design tool;
encoding, by the production quote interface, the design data for the product into an encoded product feature format; and
transmitting, by the production quote interface, the request for quote to one or more manufacturers, where the design data in the request for quote is in the encoded product feature format.

9. The method of claim 8 wherein the encoded product feature format includes a listing of components which comprise the product, for each component in the listing of components, the encoded product feature further includes a type of material for the given component, a nominal volume for the material, a manufacturing process, nominal dimensions for the manufacturing process, tolerance specification for the manufacturing process, and precedence constraints for the manufacturing process.

10. A computer-implemented method for selecting a manufacturing solution for manufacturing a product for a customer, where the manufacturing solution is comprised of two or more manufacturing processes, comprising:
receiving, by a production quote interface, a request for quote for manufacturing the product from the customer, where the request for quote incudes design data for the product and the design data is extracted from a computer-aided design tool;
encoding, by the production quote interface, the design data for the product into features in accordance with an encoded product feature format, where the features are abstracted from the design data, wherein the encoded product feature format includes a listing of components which comprise the product, for each component in the listing of components, the encoded product feature further includes a type of material for the given component, a nominal volume for the material, a manufacturing process, nominal dimensions for the manufacturing process, tolerance specification for the manufacturing process, and precedence constraints for the manufacturing process;
transmitting, by the production quote interface, the request for quote to one or more manufacturers, where the design data in the request for quote is in the encoded product feature format;
receiving a set of quotes for manufacturing the product in response to the transmission of the request for quote, where each quote identifies a manufacturer providing the given quote, provides a listing of manufacturing processes in the given quote, a cost of the given quote, and a processing time for the given quote;
receiving a set of precedence for the manufacturing processes which comprise the manufacturing solution;
generating a set of candidate solutions from the set of quotes, where each candidate solution accounts for the set of precedence and is comprised of one or more quotes, such that the one or more quotes in a given candidate solution includes each of the two or more manufacturing processes for the product;
iteratively applying a genetic algorithm to the set of candidate solutions by evaluating each candidate solution in the set of candidate solutions according to a fitness function that minimizes cost of the manufacturing solution and processing time for the manufacturing solution while maximizing quality of the product and selecting parents from the set of candidate solutions for a next generation of the genetic algorithm thereby yielding a set of optimized solutions, where the selection of parents uses output of the fitness function evaluated for each candidate solution;
presenting the set of optimized solutions for the product to the customer;
selecting an optimized solution from the set of optimized solutions; and
manufacturing the product in accordance with the selected optimized solution.

11. The method of claim 10 wherein generating a set of candidate solutions further comprises
determining availability of each of the two or more manufacturing process for inclusion in a candidate solution, where availability of a given manufacturing process complies with the set of precedence;
randomly selecting a particular manufacturing process from the available manufacturing processes;
selecting a quote from the set of quotes, where the selected quote includes the randomly selected manufacturing process;
appending the selected quote to a particular candidate solution;
repeating steps of this claim until the particular candidate solution includes each of the two or more manufacturing processes; and
adding the particular candidate solution to the set of candidate solutions.

12. The method of claim 11 wherein availability of the two or more manufacturing processes is maintained using a tracking vector, where value of an element in the tracking vector indicates availability of a given manufacturing process and number of elements in the tracking vector corresponds to number of manufacturing processes comprising the manufacturing solution.

13. The method of claim 12 further comprises setting values of elements in the tracking vector in accordance with the set of precedence prior to determining availability of the two or more manufacturing processes, thereby ensuring selection of the manufacturing processes complies with the set of precedence.

14. The method of claim 13 further comprises
receiving values for a first weight, a second weight and a third weight from the customer, where the first weight pertains to cost of the manufacturing solution, the second weight pertains to the processing time for the manufacturing solution and the third weight pertains to the quality of the product; and
evaluating each candidate solution in the set of candidate solutions according to the fitness function and using the values for the first weight, the second weight and the third weight, where the fitness function is a weight function having the first weight, the second weight and the third weight.

15. The method of claim 14 wherein iteratively applying a genetic algorithm to the set of candidate solutions includes applying a crossover operation to the selected parents and applying a mutation operation.

16. The method of claim 15 wherein evaluating each candidate solution further comprises
identifying a bottleneck manufacturing process in the particular candidate solution;
selecting another quote from the set of quotes, where the selected quote includes the bottleneck manufacturing process; and
appending the another quote to the particular candidate solution.

\* \* \* \* \*

UNITED STATES PATENT AND TRADEMARK OFFICE
CERTIFICATE OF CORRECTION

PATENT NO. : 11,494,662 B2
APPLICATION NO. : 15/999327
DATED : November 8, 2022
INVENTOR(S) : Kira Barton et al.

It is certified that error appears in the above-identified patent and that said Letters Patent is hereby corrected as shown below:

In the Claims

At Column 23, Claim number 8, Line number 29, delete "incudes" and insert -- includes --.

At Column 23, Claim number 10, Line number 54, delete "incudes" and insert -- includes --.

At Column 24, Claim number 10, Line number 1, delete "constrants" and insert -- constraints --.

Signed and Sealed this
Seventeenth Day of January, 2023

Katherine Kelly Vidal
*Director of the United States Patent and Trademark Office*